(12) United States Patent (10) Patent No.: US 12,603,018 B2
Hain (45) Date of Patent: Apr. 14, 2026

(54) AIRCRAFT DUMMY

(71) Applicant: Deutsche Post AG, Bonn (DE)

(72) Inventor: Marcel Hain, Leipzig (DE)

(73) Assignee: Deutsche Post AG, Bonn (DE)

( * ) Notice: Subject to any disclaimer, the term of this patent is extended or adjusted under 35 U.S.C. 154(b) by 178 days.

(21) Appl. No.: 18/533,767

(22) Filed: Dec. 8, 2023

(65) Prior Publication Data

US 2024/0203287 A1 Jun. 20, 2024

(30) Foreign Application Priority Data

Dec. 15, 2022 (DE) ..................... 10 2022 133 441.4

(51) Int. Cl.
G09B 19/16 (2006.01)
(52) U.S. Cl.
CPC .................................. G09B 19/167 (2013.01)
(58) Field of Classification Search
CPC ............................ G09B 19/165; G09B 19/167
See application file for complete search history.

(56) References Cited

U.S. PATENT DOCUMENTS

| | | | |
|---|---|---|---|
| 2,774,557 A | 12/1956 | Jakimiuk et al. | |
| 3,142,494 A * | 7/1964 | Kelley .................. | B60P 3/1083 |
| | | | 280/414.1 |
| 2002/0005625 A1* | 1/2002 | Palmer ................... | B60D 1/143 |
| | | | 280/504 |

FOREIGN PATENT DOCUMENTS

| | | | | |
|---|---|---|---|---|
| DE | 102008023698 A | | 11/2009 | |
| GB | 2454275 A | * | 5/2009 | ........... G09B 19/167 |

OTHER PUBLICATIONS

Extended European Search Report (w/ English translation) for corresponding Application No. 23209445.8, dated May 10, 2024, 22 pages.
German Office Action (with English translation) for corresponding German Application No. DE 10 2022 133 441.4, dated Jul. 21, 2023, 14 pages.
Hohn, "Aircraft dummy: multi-talent on the apron", dekra-solutions. com, Oct. 21, 2020, 7 pages.

* cited by examiner

*Primary Examiner* — Kang Hu
*Assistant Examiner* — Correll T French
(74) *Attorney, Agent, or Firm* — Dority & Manning, P.A.

(57) ABSTRACT

An aircraft dummy for emulating at least one aircraft type, in particular for emulating a plurality of aircraft types, includes a landing gear having a transverse axle and a longitudinal axle which extends perpendicularly relative to the transverse axle, wherein the aircraft dummy include at least two rear wheels which are suspended on the transverse axle and at least one front wheel, wherein the front wheel can be rotated about a vertical axle which extends perpendicularly to the longitudinal axle and perpendicularly to the transverse axle, and wherein the transverse axle in order to change a width of the aircraft dummy and/or the longitudinal axle in order to change a longitudinal extent of the aircraft dummy is/are configured to be longitudinally adjustable.

11 Claims, 3 Drawing Sheets

AIRCRAFT DUMMY

CROSS-REFERENCE TO RELATED APPLICATIONS

The present application is based upon and claims the right of priority to DE Patent Application Number 10 2022 133 441.4, filed Dec. 15, 2022, the disclosure of which is hereby incorporated by reference herein in its entirety for all purposes.

TECHNICAL FIELD

The invention relates to an aircraft dummy for emulating at least one aircraft type.

In addition, the invention relates to the use of a landing gear as an aircraft dummy.

BACKGROUND OF THE INVENTION

In aircraft, the term "pushback" is understood to be a pushing back of an aircraft in which the aircraft is pushed backward from the idle position thereof by means of externally provided thrust. The pushing back by means of external thrust is required since many aircraft do not have any possibility of rolling backward as a result of their own force and/or must not roll backward. The pushback is carried out by specially developed vehicles, so-called aircraft tractors. During pushback, the aircraft is thus moved backward by the aircraft tractor.

In order to practice the positioning and/or taxiing of aircraft, for example, on passenger bridges and/or from a hangar by means of aircraft tractors, so-called aircraft dummies—also known as airport ramp trainers—are generally used since the training on real aircraft would involve high costs, in particular in the event of damage to the aircraft. As a result of the training on the aircraft dummy, the risk of damage to the actual aircraft during training is excluded. In addition, the complex work procedures can be practiced without risk so that the probability of damage during actual operation with the aircraft decreases.

The pushback of the aircraft and the aircraft dummy, which imitates the real aircraft, is carried out either via a traction bar (also referred to as a towbar) which is coupled between the aircraft and aircraft tractor or aircraft dummy and aircraft tractor, or by means of a lifting truck in which the nose landing gear of the aircraft or the accordingly similar front wheel of the aircraft dummy is raised.

Since during the pushback of the aircraft the internal aircraft control of the nose landing gear is deactivated and can consequently be pivoted freely to the right and left, the steering of the aircraft is carried out during the pushback around a bend as a result of the cooperation of the steering movements of the aircraft tractor and the nose landing gear of the aircraft in a complex manner, wherein in this instance the steering behavior is also dependent on the specific aircraft type and in particular the dimensions of the aircraft or the landing gear thereof.

The aim of the aircraft dummy is to imitate this complex steering behavior. However, the disadvantage of known aircraft dummies so that they imitate only one specific type of aircraft so that a plurality of different aircraft dummies have to be kept available in order to practice the pushback of different aircraft types. There is therefore a requirement for flexible aircraft dummies.

From the technical article by HÖHN, Sebastian "Flugzeug-Dummy: Multitalent auf dem Vorfeld" ("Aircraft dummy: Multi-talent on the airport ramp") in Dekra Solutions magazine, DEKRA e.V. (Handwerkstrasse 15, 70565 Stuttgart) which can be found under https://www.dekra-solutions.com/2020/10/flugzeug-dummy-multitalent-auf-dem-vorfeld, an aircraft dummy which enables ground staff to test all situations in order to prevent damage and accidents is known.

The document U.S. Pat. No. 2,774,557 A relates to improvements on or in connection with aircraft take-off trolleys which are suitable in particular for use as an auxiliary device in order to enable tactical aircraft to take-off from all types of airfields or runways and landing strips.

The document DE 10 2008 023 698 A1 relates to an apparatus in the form of a ground-based device for the take-off, landing and taxiing operation of aircraft or flying objects without a landing gear system or with a retracted landing gear which comprises three main components sliding member, trolley and ground landing gear and where possible has the following main features: a) no significant changes of the existing operating procedures, the pilot and autopilot and air traffic control procedures; b) extensive retention of existing airport and landing strip structures; c) dual capacity for use of the landing strip of conventional and aircraft without landing gear; d) minimal retrofitting expenditure of existing aircraft; e) support of the acceleration of the aircraft during take-off; f) simultaneous handling of a plurality of aircraft at the airport; g) forward and backward rolling on the ground with the main engines switched off; h) use of brake energy.

DESCRIPTION OF THE INVENTION

Based on this situation, an object of the present invention is to provide an aircraft dummy which imitates different types of aircraft.

The object of the invention is achieved by the features of the independent claims. Advantageous embodiments are set out in the dependent claims.

Accordingly, the object is achieved with an aircraft dummy for emulating at least one aircraft type, in particular for emulating a plurality of aircraft types, comprising a landing gear having a transverse axle and a longitudinal axle which extends perpendicularly to the transverse axle, wherein the aircraft dummy comprises at least two rear wheels which are suspended on the transverse axle and at least one front wheel, wherein the front wheel can be rotated about a vertical axle which extends perpendicularly to the longitudinal axle and perpendicularly to the transverse axle, and wherein the transverse axle in order to change a width of the aircraft dummy and/or the longitudinal axle in order to change a longitudinal extent of the aircraft dummy is/are configured to be longitudinally adjustable.

The object is further achieved by using a landing gear as an aircraft dummy, wherein the landing gear comprises a transverse axle and a longitudinal axle which extends perpendicularly to the transverse axle and at least two rear wheels which are suspended on the transverse axle and at least one front wheel, wherein the front wheel can be rotated about a vertical axle which extends perpendicularly to the longitudinal axle and perpendicularly to the transverse axle, and wherein the transverse axle in order to change a width of the landing gear and/or the longitudinal axle in order to change a longitudinal extent of the landing gear is/are configured to be longitudinally adjustable.

Preferably, the transverse axle is configured to change the width and in particular the track gauge of the aircraft dummy and the longitudinal axle is configured to be able to be changed in terms of length in order to change the longitudinal extent of the aircraft dummy. This enables different aircraft types to be simulated using only one aircraft dummy. Accordingly, the purchase of a plurality of aircraft dummies can be dispensed with. Consequently, an aircraft dummy which is suitable for emulating different aircraft types and/or simulating the steering behavior during pushback of different aircraft types is preferably involved.

One aspect of the invention is the landing gear which comprises the transverse axle and the longitudinal axle which extends perpendicularly to the transverse axle. At least two rear wheels are suspended on the transverse axle. Preferably, the rear wheels are suspended on two mutually opposing ends of the transverse axle. Preferably, the at least one front wheel is connected to the longitudinal axle by means of the vertical axle in such a manner that the at least one front wheel is preferably arranged at one end of the longitudinal axle. Consequently, the wheels of the aircraft dummy are preferably arranged in accordance with a triangle. As a result of the longitudinal axle, the transverse axle and the wheel arrangement, a triangular arrangement of the wheels of the aircraft dummy is preferably produced. In this manner, a three-point landing gear and in particular a so-called tricycle-nose gear of an actual aircraft can be simulated particularly well.

The width of the aircraft dummy is preferably defined by the spacing between the two rear wheels which is also referred to as the track gauge. The longitudinal extent of the aircraft dummy is preferably defined by the shortest spacing between the front wheel and a distance which connects the two rear wheels. The width and the longitudinal extent of the aircraft dummy influence the properties involving how the aircraft dummy behaves when taxiing with an aircraft tractor. Consequently, by adjusting the width and/or adjusting the longitudinal extent of the aircraft dummy, different aircraft types can be emulated. Since the aircraft dummy simulates a real aircraft typical dimensions of the aircraft dummy preferably correspond to the dimensions of the landing gear of actual aircraft. Preferably, the aircraft dummy is with respect to the longitudinal extent between 5 m and 20 m long and/or with respect to the width between 2 m and 7 m wide.

With respect to the landing gear, according to a preferred further development of the invention, there is provision for the landing gear to be configured in a T-shaped manner.

Preferably, the longitudinal axle corresponds to the vertical line of the "T" and the transverse axle corresponds to the horizontal line of the "T". In other words, there is preferably provision for the longitudinal axle and the transverse axle of the landing gear to be connected to each other, wherein in particular one end of the longitudinal axle is connected to a center of the transverse axle. More preferably, the T-shaped landing gear preferably has two diagonal struts. The diagonal struts preferably connect the longitudinal axle to the transverse axle in each case. The diagonal struts increase the stability of the landing gear.

According to another preferred further development of the invention, there is provision for the transverse axle and/or the longitudinal axle to be configured in a telescope-like manner in order to change the length. In a particularly preferred manner, the transverse axle and the longitudinal axle are in the form of telescope-like pull-outs. In principle, it is possible for the longitudinal axle and/or the transverse axle each to be formed by a large number of pieces which engage one in the other. Preferably, there is provision for the longitudinal axle to be formed by two pieces which engage one in the other. This increases the stability of the landing gear. With respect to the transverse axle, there is preferably provision for the transverse axle to be formed by three pieces which engage one in the other. Preferably, the longitudinal axle and more preferably the diagonal struts are connected to a central piece of the transverse axle.

According to another preferred further development of the invention, there is provision for the landing gear to comprise precisely three telescope-like pull-outs. This has the advantage that the landing gear is very robust as a result of the simple construction. Preferably, the longitudinal axle has a telescope-like pull-out and the transverse axle has two telescope-like pull-outs. The configuration of the transverse axle comprising three pieces which engage one in the other and/or with two telescope-like pull-outs enables not only the width and in particular the track gauge of the aircraft dummy to be able to be changed, but also an angle between the longitudinal axle and a line which connects the front wheel to the rear wheel to be able to be adjusted individually for each rear wheel.

With respect to the telescope-like pull-outs according to another preferred further development, there is provision for the longitudinal axle and/or transverse axle in order to lock a longitudinal adjustment to comprise an opening which extends through the longitudinal axle and a locking pin. Preferably, at least one of the pieces which engage one in the other has a plurality of openings which are arranged beside each other. Such a locking enables a particularly simple and robust configuration.

With regard to the front wheel, according to another preferred further development of the invention, there is provision for the front wheel to be able to be rotated through 360 degrees about the vertical axle. Preferably, the front wheel can even be rotated completely several times. In other words, after a 360 degree rotation, it can also be rotated further in the same direction. In this context, according to another preferred further development of the invention, there is provision for the aircraft dummy to comprise a joint head in order to rotate the front wheel about the vertical axle. Preferably, the joint head comprises a ball bearing and/or roller bearing and/or it is a ball bearing joint head. In this manner, the internal aircraft control, which has been deactivated during pushback of the aircraft, of the nose landing gear can be simulated in a simple manner.

According to another preferred further development of the invention, there is provision for the transverse axle to be angled at right-angles at both ends in such a manner that a proportion of the transverse axle extends parallel with the vertical axle. Accordingly, the ground clearance of the aircraft dummy is preferably not determined exclusively by means of a diameter of the rear wheels, but instead also by means of the length of the portion of the transverse axle which extends parallel with the vertical axle. This makes it particularly simple to provide an aircraft dummy which has sufficient ground clearance to be able to provide a front wheel which can be rotated through 360 degrees. Furthermore, it is thereby ensured that the aircraft dummy does not collide with the aircraft tractor during the steering operation. Preferably, the ground clearance is at least 1300 mm.

According to another preferred further development of the invention, there is provision for the front wheel to comprise a wheel axle which extends perpendicularly to the vertical axle and two tires which are fitted to the wheel axle. Preferably, the front wheel is thus in the form of a dual wheel. The front wheel is thus preferably configured in accordance with a nose wheel in a real aircraft, in which the configuration as a dual wheel ensures the necessary stability.

The wheel axle is additionally preferably arranged in a plane which is defined by the transverse axle and the longitudinal axle.

According to another preferred further development of the invention, there is provision for the front wheel to be configured for coupling to an aircraft tractor. In a particularly preferred manner, there is provision for the front wheel to be able to be coupled to a traction bar and/or for the front wheel to be able to be surrounded from both sides by means of an aircraft tractor. In principle, there are two possibilities for how aircraft tractors interact with the aircraft in order to carry out the pushback, wherein both possibilities are preferably depicted by the aircraft dummy. In a first possibility, the nose wheel of the aircraft is connected to the aircraft tractor by means of the traction bar (also referred as the towbar). In order to depict this possibility in the aircraft dummy, the front wheel of the aircraft dummy can preferably be coupled to the traction bar. In an alternative possibility, the aircraft is moved without a traction bar by the nose wheel of the aircraft being raised by the aircraft tractor, which is also referred to as a nose lift. To this end, a hydraulic apparatus of the aircraft tractor engages round the nose wheel and lifts it. In order to depict this possibility with the aircraft dummy, the front wheel of the aircraft dummy is preferably configured so as to be able to surrounded from both sides by means of the aircraft tractor.

With respect to the front wheel, according to another preferred further development of the invention, there is provision for the front wheel for coupling to the traction bar to comprise a pin which extends perpendicularly to the vertical axle. The pin preferably extends parallel with the wheel axle and/or is arranged in the plane which is defined by the transverse axle and the longitudinal axle. During pushback by means of the traction bar, the traction bar is preferably coupled rigidly to the pin of the front wheel and supported at all sides so as to be able to be pivoted at the side of the aircraft tractor. The steering of the aircraft dummy by means of the aircraft tractor is consequently carried out in a similar manner to a drawbar in a multi-axle trailer as a result of the interaction of the steering movements of the aircraft tractor, the traction bar and the front wheel of the aircraft dummy.

In order to prevent damage to the aircraft, the aircraft dummy and/or the traction bar, according to another preferred further development of the invention there is additionally provision for the pin to be supported so as to be able to be rotated about the longitudinal axle thereof. This prevents damage from occurring during the pushback. The longitudinal axle of the pin is preferably parallel with the wheel axle.

There is further preferably provision for the pin to comprise a length of at least 150 mm and/or to comprise a length of no more than 210 mm. For example, the length of the pin is 180 mm. In a further preferred manner, the pin has a diameter of at least 30 mm and/or a diameter of no more than 45 mm. For example, the diameter of the pin is 36 mm. This corresponds to the diameter of the pin in a Boeing 757. These dimensions enable the same traction bars to be used for coupling to the aircraft dummy as are used for coupling to real aircraft. In a further preferred manner, there is provision for the diameter of the pin to be adapted to the traction bar.

According to another preferred further development of the invention, there is provision for a tire of the front wheel to have a diameter of 595 mm. In a further preferred manner, a width of the tire of the front wheel is 235 mm. In a particularly preferred manner, the tire of the front wheel has dimensions of 235/75 R17.5. This preferably corresponds to the tire dimensions used in real aircraft.

In this context, according to another preferred further development of the invention, there is provision for a load-bearing capacity of the front wheel to be at least 80 t. Preferably, the load-bearing capacity is precisely 80 t, more preferably more than 100 t, for example, 121 t. A load-bearing capacity in this range is advantageous since bursting of the tires of the front wheel as a result of the clamping by means of a hydraulic apparatus on the aircraft tractor during the nose lift can thereby be prevented.

According to another preferred further development of the invention, there is provision for the longitudinal extent of the aircraft dummy with the smallest length adjustment of the longitudinal axle to be less than 9 m, preferably less than 8 m and in a particularly preferred manner less than 7 m. For example, the longitudinal extent of the aircraft dummy with the smallest longitudinal adjustment of the longitudinal axle is 6550 mm. More preferably, the longitudinal extent of the aircraft dummy with the greatest longitudinal adjustment of the longitudinal axle is greater than 12 m, preferably greater than 13 m and in a particularly preferred manner greater than 14 m. For example, the longitudinal extent of the aircraft dummy with the greatest longitudinal adjustment of the longitudinal axle is 14987 mm.

With respect to the width of the aircraft dummy, there is preferably provision for the width of the aircraft dummy with the smallest longitudinal adjustment of the transverse axle to be less than 3.5 m, preferably less than 2 m and in a particularly preferred manner less than 2.8 m. For example, the width of the aircraft dummy with the smallest longitudinal adjustment of the transverse axle is 2730 mm. More preferably, the width of the aircraft dummy with the greatest longitudinal adjustment of the transverse axle is greater than 4 m, preferably greater than 4.5 m and in a particularly preferred manner greater than 5 m. For example, the width of the aircraft dummy with the greatest longitudinal adjustment of the transverse axle is 5230 mm.

According to another preferred further development of the invention, the aircraft dummy has reflective faces which are arranged above the front wheel. Preferably, the reflective faces are fitted on the vertical axle above the front wheel. More preferably, the reflective faces cannot be rotated with respect to the longitudinal axle and/or transverse axle. In particular, the reflective faces are arranged in such a manner that they correspond to the landing lights of the aircraft. In this manner, the same potentially disruptive reflections are produced for the driver of the aircraft tractor by the reflective faces when light falls on them as by an aircraft. Accordingly, such situations can also be practiced with the aircraft dummy.

BRIEF DESCRIPTION OF THE DRAWINGS

The invention is explained in greater detail below with reference to the appended drawings and a preferred exemplary embodiment.

In the drawings.

7

8

Figure 1:
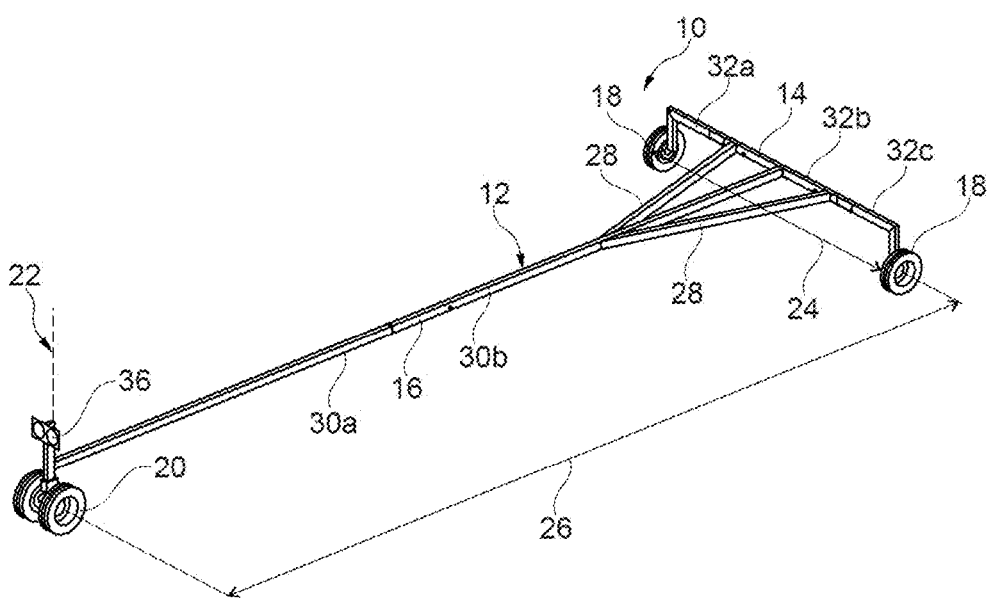
FIG. 1 shows a schematic, perspective view of an aircraft dummy according to a preferred exemplary embodiment of the invention.
Figure 5:
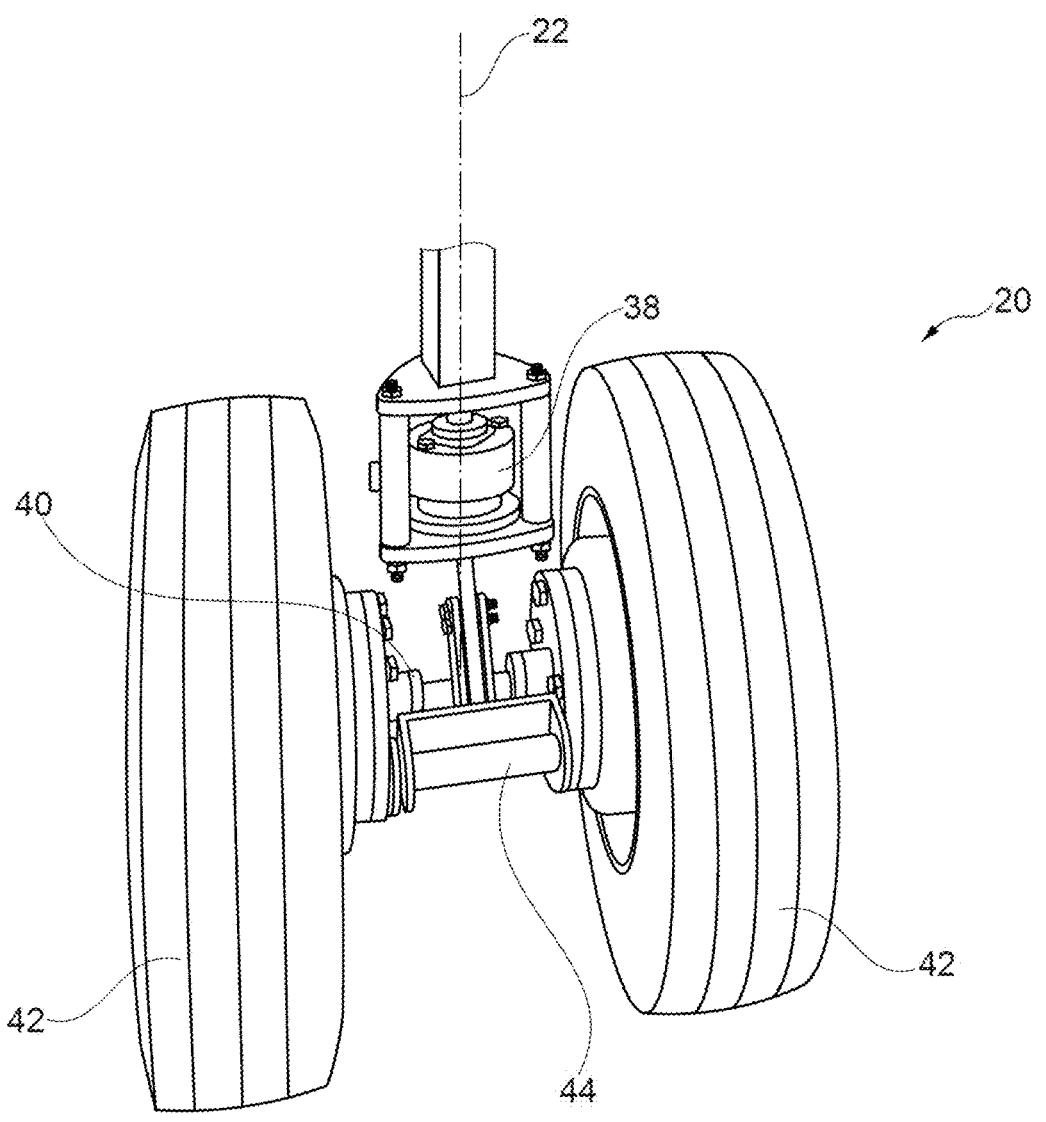

FIG. 5 shows a schematic enlarged illustration of a front wheel of the aircraft dummy from FIG. 1.

DETAILED DESCRIPTION OF THE EXEMPLARY EMBODIMENT

FIGS. 1 to 5 show in each case schematic views of an aircraft dummy 10 for emulating a plurality of aircraft types according to a preferred exemplary embodiment of the invention. The aircraft dummy 10 of this exemplary embodiment comprises a landing gear 12, wherein the landing gear 12 comprises a transverse axle 14 and a longitudinal axle 16 which extends perpendicularly to the transverse axle 14. Two rear wheels 18 are suspended on the transverse axle 14 and a front wheel 20 is suspended on the longitudinal axle 16. The front wheel 20 can be rotated about a vertical axle 22 which extends transversely relative to the longitudinal axle 16 and perpendicularly relative to the transverse axle 14. Furthermore, in this instance the transverse axle 14, in order to change a width 24 of the aircraft dummy 10, and the longitudinal axle, in order to change a longitudinal extent 26 of the aircraft dummy 10, are configured to be able to be longitudinally adjustable.

The landing gear 12 is in this instance configured in a T-shaped manner, wherein the longitudinal axle 16 corresponds to the vertical line of the "T" and the transverse axle 14 corresponds to the horizontal line of the "T". In addition, the landing gear 12 has two diagonal struts 28 which connect the longitudinal axle 16 to the transverse axle 14.

The transverse axle 14 and the longitudinal axle 16 are configured for longitudinal adjustment as telescope-like pull-outs. The longitudinal axle 16 has two pieces 30*a*, 30*b* which engage one in the other and the transverse axle 14 has three pieces 32*a*, 32*b*, 32*c* which engage one in the other. The central piece 32*b* of the transverse axle 14 is additionally connected by means of the diagonal struts 28 to the piece 30*b* of the longitudinal axle 16. The rear wheels 18 are suspended on the pieces 32*a* and 32*c* of the transverse axle 14, the front wheel 20 is suspended on the piece 30*a*.

Figure 2:
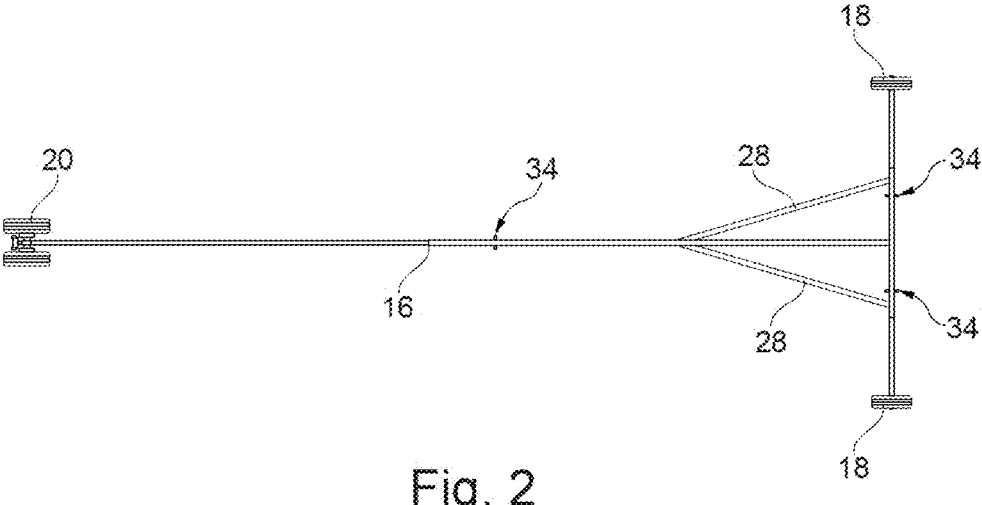
FIG. 2 shows a schematic illustration of the aircraft dummy from FIG. 1 from above.
Figure 3:
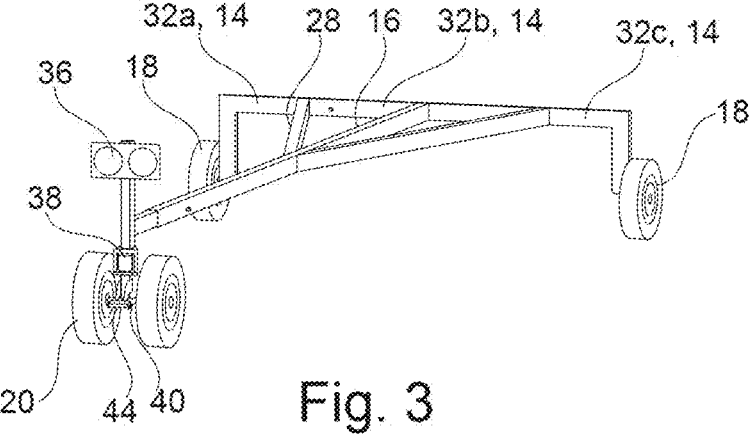
FIG. 3 shows another schematic, perspective view of the aircraft dummy from FIG. 11.

As can be seen particularly clearly in FIG. 2, the telescope-like pull-outs of the transverse axle 14 and the longitudinal axle 16 have in each case for locking a specific longitudinal adjustment a locking pin 34 which extends through an opening. Above the front wheel 20, the aircraft dummy 10 additionally has a reflective face 36. In this instance, the reflective faces 36 are arranged in such a manner that they correspond to the landing lights of a real aircraft.

Figure 4:
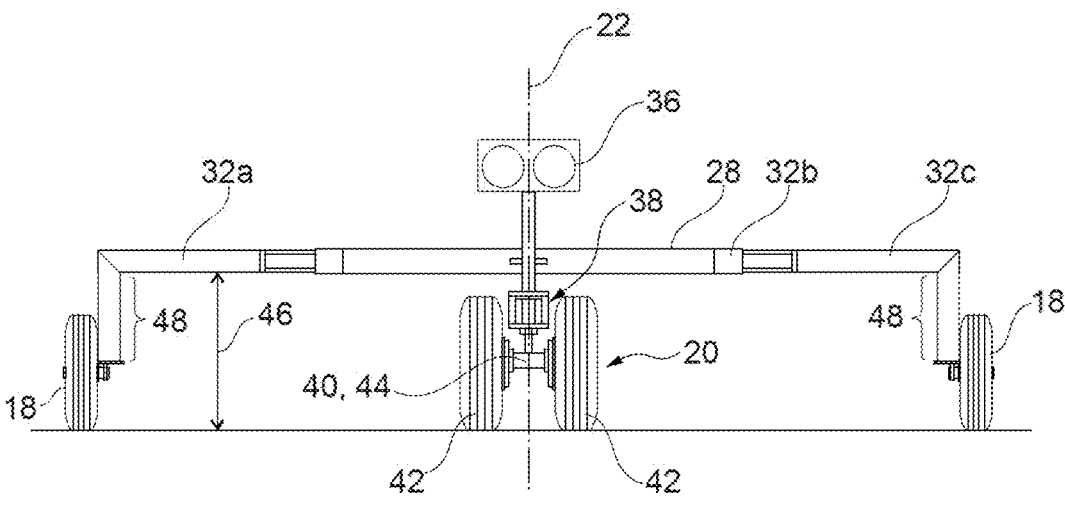
FIG. 4 shows another schematic, perspective view of the aircraft dummy from FIG. 1 from the front.

With regard to the front wheel 20, there is additionally provision for the front wheel 20 to be able to be rotated through 360 degrees about the vertical axle 22. As can be seen in particular in FIGS. 3, 4 and 5, the aircraft dummy 10 of this exemplary embodiment has in order to rotate the front wheel 20 about the vertical axle 22 a joint head 38. It can also be clearly seen in these Figures that the front wheel 20 comprises a wheel axle 40 which extends perpendicularly to the vertical axle 22 and two tires 42 which are fitted to the wheel axle 40. In addition, a pin 44 which is configured for coupling to a traction bar of an aircraft tractor can be seen. As shown in FIG. 4, for sufficient ground clearance 46 the transverse axle 14 is angled at right-angles at both ends in such a manner that a proportion 48 of the transverse axle 14 extends parallel with the vertical axle 22.

The exemplary embodiment described is purely an example which can be modified and/or supplemented in a variety of ways in the context of the claims.

LIST OF REFERENCE NUMERALS

Aircraft dummy 10
Landing gear 12
Transverse axle 14
Longitudinal axle 16
Rear wheel 18
Front wheel 20
Vertical axle 22
Width 24
Longitudinal extent 26
Diagonal strut 28
First piece of the longitudinal axle 30*a*
Second piece of the longitudinal axle 30*b*
First piece of the transverse axle 32*a*
Second/central piece of the transverse axle 32*b*
Third piece of the transverse axle 32*c*
Locking pin 34
Reflective face 36
Joint head 38
Wheel axle 40
Tire 42
Pin 44
Ground clearance 46
Portion of the transverse axle which extends parallel with the vertical axle 48

The invention claimed is:

1. An aircraft dummy for emulating at least one aircraft type, comprising a landing gear having a transverse axle and a longitudinal axle which extends perpendicularly relative to the transverse axle,
   wherein the aircraft dummy comprises at least two rear wheels which are suspended on the transverse axle and at least one front wheel,
   wherein the front wheel can be rotated about a vertical axle which extends perpendicularly to the longitudinal axle and perpendicularly to the transverse axle, wherein the vertical axle is fixed to the front end of the longitudinal axle opposite from the transverse axle, and wherein the transverse axle, in order to change a width of the aircraft dummy, and the longitudinal axle, in order to change a longitudinal extent of the aircraft dummy, are configured to be longitudinally adjustable.

2. The aircraft dummy according to the claim 1, wherein the landing gear is configured in a T-shaped manner, and comprises two diagonal struts and/or wherein the wheels of the aircraft dummy are arranged in accordance with a triangle.

3. The aircraft dummy according to claim 1, wherein the transverse axle and/or the longitudinal axle are configured in a telescope-like manner in order to change the length.

4. The aircraft dummy according to claim 1, wherein the front wheel can be rotated through 360 degrees about the vertical axle and/or wherein the aircraft dummy in order to rotate the front wheel about the vertical axle comprises a joint head.

5. The aircraft dummy according to claim 1, wherein the front wheel comprises a wheel axle which extends perpendicularly to the vertical axle and two tires which are fitted to the wheel axle or wherein the front wheel is in the form of a wheel pair.

6. The aircraft dummy according to claim 1, wherein the front wheel can be coupled to a traction bar or wherein the front wheel can be surrounded from both sides by means of an aircraft tractor.

7. The aircraft dummy according to claim 1, wherein the front wheel for coupling to a traction bar comprises a pin which extends perpendicularly to the vertical axle.

8. The aircraft dummy according to claim 7, wherein the pin is supported so as to be able to be rotated about the longitudinal axle thereof.

9. The aircraft dummy according to claim 8, wherein a load-bearing capacity of the front wheel is at least 80 tons.

10. The aircraft dummy according to claim 1, wherein the aircraft dummy has reflective faces which are arranged above the front wheel.

11. The aircraft dummy according to claim 1, wherein the longitudinal extent of the aircraft dummy with the smallest longitudinal adjustment of the longitudinal axle is less than 9 m and/or wherein the longitudinal extent of the aircraft dummy with the greatest longitudinal adjustment of the longitudinal axle is greater than 12 m and/or wherein the width of the aircraft dummy with the smallest longitudinal extent of the transverse axle is less than 3.5 m and/or wherein the width of the aircraft dummy with the greatest longitudinal adjustment of the transverse axle is greater than 4 m.

* * * * *